(12) United States Patent
Chen et al.

(10) Patent No.: US 11,580,099 B2
(45) Date of Patent: Feb. 14, 2023

(54) CONTEXT-AWARE QUERY SUGGESTIONS

(71) Applicant: Microsoft Technology Licensing, LLC, Redmond, WA (US)

(72) Inventors: Wenxiang Chen, Sunnyvale, CA (US); William Tang, Saratoga, CA (US); Runfang Zhou, Sunnyvale, CA (US); Tanvi Sudarshan Motwani, Santa Clara, CA (US); Jeremy Lwanga, San Francisco, CA (US); Sara Smoot Gerrard, Palo Alto, CA (US); Daniel Sairom Krishnan Hewlett, Sunnyvale, CA (US); Alexandre Patry, Dublin, CA (US); Songtao Guo, Cupertino, CA (US); Sai Krishna Bollam, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 17/038,395

(22) Filed: Sep. 30, 2020

(65) Prior Publication Data
US 2022/0100746 A1 Mar. 31, 2022

(51) Int. Cl.
*G06F 16/00* (2019.01)
*G06F 16/242* (2019.01)
(Continued)

(52) U.S. Cl.
CPC ...... *G06F 16/2425* (2019.01); *G06F 16/9035* (2019.01); *G06F 16/90328* (2019.01); *G06K 9/6257* (2013.01)

(58) Field of Classification Search
CPC .......... G06F 16/2425; G06F 16/90328; G06F 16/9035; G06F 16/24575; G06F 16/9535; G06K 9/6257
See application file for complete search history.

(56) References Cited

U.S. PATENT DOCUMENTS

| 9,600,600 B2 * | 3/2017 | Glass | G06F 16/951 |
| 2007/0162422 A1 * | 7/2007 | Djabarov | G06F 16/2453 |

(Continued)

OTHER PUBLICATIONS

Dammaketai, "Improving pairwise learning to rank algorithms for Document Retrieval", IEEE, pp. 1-8 (Year: 2017).*

*Primary Examiner* — Jared M Bibbee
(74) *Attorney, Agent, or Firm* — Schwegman, Lundberg & Woessner, P.A.

(57) ABSTRACT

Methods are presented for providing dynamic search filter suggestions that are updated and ranked based on the user filter selections. One method includes detecting a query received in a user interface (UI), calculating, by a search-candidate model, first search results, and calculating, by a suggestions model, first filter suggestions for filter categories to filter responses to the query. The suggestions model is obtained by training a machine-learning algorithm utilizing pairwise learning-to-rank modeling. The first search results and the first filter suggestions are presented in the UI. When a selection in the UI of a filter suggestion is detected, the search-candidate model calculates second search results for the filter categories based on the query and the selected filter suggestion, and the suggestions model calculates second first filter suggestions based on the query and the selected filter suggestion. The second search results and the second filter suggestions are presented in the UI.

21 Claims, 9 Drawing Sheets

(51) Int. Cl.
    *G06K 9/62*           (2022.01)
    *G06F 16/9032*    (2019.01)
    *G06F 16/9035*    (2019.01)

(56) References Cited

U.S. PATENT DOCUMENTS

| | | | |
|---|---|---|---|
| 2011/0093478 A1* | 4/2011 | Starks | G06F 16/9535 |
| | | | 707/754 |
| 2011/0264650 A1* | 10/2011 | Tobin | G06F 16/248 |
| | | | 707/E17.014 |
| 2012/0136886 A1* | 5/2012 | Brewer | G06F 16/90324 |
| | | | 707/767 |
| 2017/0364596 A1* | 12/2017 | Wu | G06Q 50/01 |
| 2018/0046703 A1* | 2/2018 | Lavie | G06F 16/3323 |
| 2018/0113927 A1* | 4/2018 | Juarez | G06F 16/903 |
| 2018/0349399 A1* | 12/2018 | Garg | G06F 16/3322 |

* cited by examiner

100

102

🔍 Start a new search

Showing results for
≡ Custom filters ▽

Job titles 204
(Software Engineer) + 206
+ Engineering Manager,

Locations 106
+ Candidate geographic locations
+ San Francisco Bay Area (126K)

Skills
(C++) (Python) ~ 302
(Machine Learning)
(Java) (Programming) +
+ Algorithms, + Linux ~ 304

Companies
+ Companies
+ Facebook, + SAP, + Google

Schools
+ Schools attended
+ MIT, + USC

Industries

6,542,136   1,546,964   1,000,203
total        likely respond  open to opp
             218

Carl Carlson
C++ Guru at Corp C
Honolulu, Hawaii, US

Education: University of Paris

[Save]

Jane Doe
Software Engineer at Corp B
Irving, Texas, US

Education: University of Houston

[Save]

CONTEXT-AWARE QUERY SUGGESTIONS

TECHNICAL FIELD

The subject matter disclosed herein generally relates to methods, systems, and machine-readable storage media for improving online searches and, more particularly, methods, systems, and machine-readable storage media for providing dynamic filter suggestions.

BACKGROUND

Data search can be inefficient when sorting through a large number of items (e.g., millions, tens of millions). In a simple search query interface, the user enters keywords that define the search parameters. Search systems have improved over the years, such as by improving the ranking of search results based on the queries. However, sometimes there may be a large number of results to sort through (e.g., hundred thousand, millions, or more), and the optimal results are not necessarily the ones ranked at the top of the list of results. There is a lack of efficient tools to assist the users in narrowing and ranking the results based on the users' needs.

What is needed are tools that help the users narrow the field of results to obtain the desired search results easily and quick.

BRIEF DESCRIPTION OF THE DRAWINGS

Various of the appended drawings merely illustrate example embodiments of the present disclosure and cannot be considered as limiting its scope.

FIG. 3 shows the narrowing of search results after selecting suggested filters, according to some example embodiments.

DETAILED DESCRIPTION

Figure 1A:
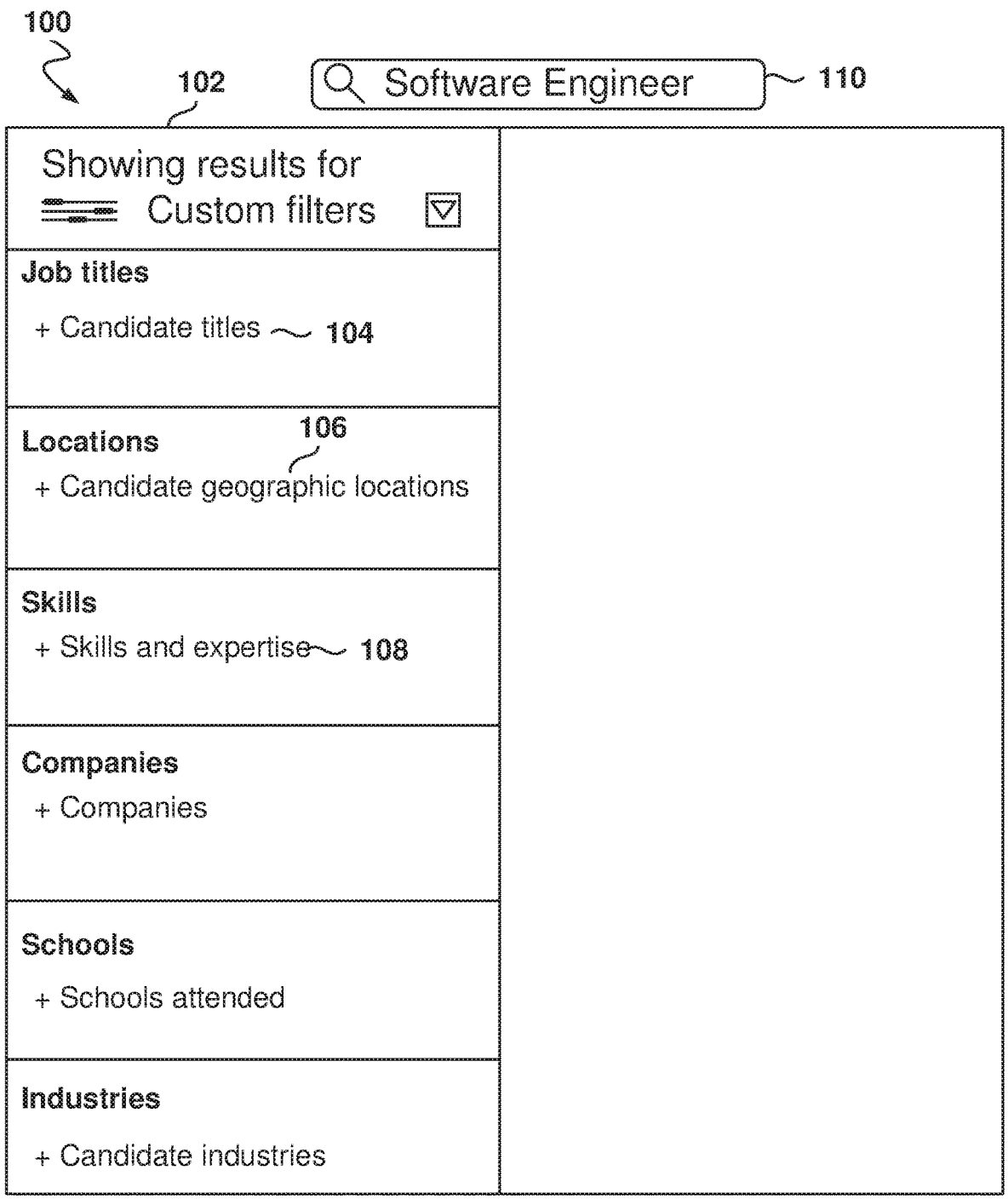
FIGS. 1A and 1B are user interfaces to search for job posting candidates, according to some example embodiments.

Example methods, systems, and computer programs are directed to providing dynamic search filter suggestions that are updated and ranked based on the user filter selections. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, search tools are provided to the user. The search tools include multiple filter categories, also referred to as facets, that allow the user to quickly zoom in on the desired results. For example, within a search for possible candidates for a job, a search tool provides a recruiter with filter categories (e.g., skill, job title, location, company, graduation year), and the user interface provides filter suggestions within the filter categories to refine the selected filter values. As the user selects some of the filter suggestions, the user interface regenerates the filter suggestions by using a suggestions model that updates all the filters suggestions in each of the filter categories based on what would be the most valuable filter suggestions for the search.

By considering all the selected filter values, for all the filter categories, the system is context aware, which results in better suggestions models. In some examples, the suggestions models are based on Learning to Rank (LTR) models, but other models are also possible. As a result, the ranking metrics for the top search-result positions are improved, resulting in a more efficient system and improved customer satisfaction (e.g., measured as an increase in the number of confirmed hires).

Although embodiments are presented with reference to searching candidates for a job post, the same principles may be utilized for other types of searches, such as searches for items to include in a user feed on an online service, searches for news articles, searches for people, searches for jobs, etc.

One general aspect includes a method that includes operations for detecting a search query received from a user in a user interface (UI). Further, the method includes operations for calculating, by a search-candidate model, first search results based on the search query, and for calculating, by a suggestions model, first filter suggestions for a plurality of filter categories for filtering responses to the search query. The suggestions model is obtained by training a machine-learning algorithm utilizing pairwise learning-to-rank modeling. Further, the method includes presenting in the UI the first search results and the first filter suggestions and detecting a selection in the UI of a filter, in a first filter category, from the plurality of first filter suggestions. In response to the detection of the filter suggestion, the method performs operations for calculating, by the search-candidate model, second search results based on the search query and the selected filter suggestion, and for calculating, by the suggestions model, second first filter suggestions for the plurality of filter categories based on the search query and the selected filter suggestion. Further, the second search results and the plurality of the second filter suggestions are presented in the UI.

For the purposes of this description the phrases "an online social networking application," "an online social network system," and "an online social network service" may be referred to as and used interchangeably with the phrase "an online social network" or merely "asocial network" or an "online service." It will also be noted that an online social network may be any type of an online social network, such as, e.g., a professional network, an interest-based network, or any online networking system that permits users to join as registered members. For the purposes of this description, registered members of an online social network may be referred to as simply members. Further, some online services provide services to their members (e.g., search for jobs, search for candidates for jobs, job postings) without being a social network, and the principles presented herein may also be applied to these online services.

Embodiments are presented with reference to candidate searches for job postings, but the same principles may be applied to other types of searches, such as searches for job postings by a member, searches for items to include in a user feed, searches for advertisements to present to members, searches for possible connections in the online social networking service, etc.

FIG. 1A is a user interface 100 to search for job posting candidates, according to some example embodiments. A search entry field 110 is for receiving text search parameters, and a search panel 102 includes a plurality of filter categories to enable the user to select filter values when searching for candidates. The user has the option to enter a search query in search entry field 110 or start selecting filter suggestions from the search panel 102, such as by adding candidate titles 104, geographic locations 106, skills and expertise 108, etc.

Thus, the different filter categories allow the searcher to select a job title (e.g., Software Engineer, Data Scientist), a geographic location (e.g., San Francisco Bay Area), a skill (e.g., Italian cook), a particular company (e.g., Microsoft), a school that the candidate attended, or an industry (e.g., manufacturing).

Figure 1B:

FIG. 1B shows another user interface 120 for searching candidates, according to some example embodiments. In the user interface 120, the searcher is presented with the search entry field 110 without options for entering the filter values. That is, initially, the search request is based on the entry text provided by the searcher.

The user interface 120 also provides additional information 122 related to the ongoing search projects of the searcher, such as job postings and the activity associated with those job postings, number of views and number of responses.

Figure 2:
FIG. 2 is a search user interface that includes filter suggestions, according to some example embodiments.

After the search is performed, then the searcher is presented with filter suggestions to modify the search, such as in the user interface presented in FIG. 2.

It is noted that the embodiments illustrated in FIGS. 1A and 1B are examples and do not describe every possible embodiment. Other embodiments may utilize fewer filters, additional filters, different filters, different layouts, etc. The embodiments illustrated in FIGS. 1A and 1B should therefore not be interpreted to be exclusive or limiting, but rather illustrative.

FIG. 2 is the user interface 100 with filter suggestions, according to some example embodiments. The results of the search are displayed in search results panel 218, which includes candidates that match the search query and are ranked based on the degree in which they match the requirements of the search query. Additionally, a "Save" button 220 allows the searcher to save this candidate in project list of candidates for easier retrieval by the searcher.

After processing the search query, the system updates the corresponding filter suggestions. In this case, the query "Software Engineer" is detected as a job title, which results in the selected filter value 204 "Software Engineer" being added in the job-titles section.

Additionally, the search system adds filter suggestions based on the current state of the search, which at this time refers to the single selected filter value of "Software Engineer" for job title. The filter suggestions, also referred to as "Smart Suggestions," are added in at least one of or each of the filter categories and are selected based on the calculated probability that these filter suggestions, when presented, will be selected by the user. In this example, the filter suggestions 206 include "Engineering Manager" being added to the job-titles section; "San Francisco Bay Area" 208 being added to the locations filter; "Java" and "JavaScript" 210 being added to the skills filters; "Google," "Amazon," and "Microsoft" 212 being added to the companies filter; "USC" and "Stanford" being added to the schools filter; and "Computer Software" being added to the industries filter.

In some example embodiments, a suggestions machine-learning (ML) model is used to generate the filter suggestions, as described below with reference to FIGS. 4 and 5.

In some embodiments, more than one search filter value may be selected, and the search results may be filtered to include either the union or the intersection of the selected filter values (e.g., adding the selected filter values with a logical AND or with a logical OR). In some example embodiments, each of the selected filter values within a filter category are combined using a logical OR function, but the selected filter values from the different categories are combined using a logical AND function. Other combinations are also possible, such as using exclusively logical AND combinations for combining filter categories and filter values within each of the filter categories.

FIG. 3 shows the narrowing of search results after selecting suggested filters, according to some example embodiments. Once a filter suggestion is selected, the suggestion becomes an active filter, such as selected filter value "Python" 302 for the skills filter category. In the illustrated example, the user has selected several skill filter values, including "C++," "Python," "Machine Learning," "Java," and "Programming."

It is noted that the filter suggestions, for all filter categories, are not static and are automatically recalculated every time a filter suggestion is selected, even if the filter value selected is in a different filter category. For example, in FIG. 3 the suggestions for the "Companies" filter category have changed to "Facebook," "SAP," and "Google," even though no company filter value has been selected. The system has detected that, for the given filter values, the new suggested companies have a higher probability of being selected by the user than the previous suggestions shown in FIG. 2.

Figure 4:
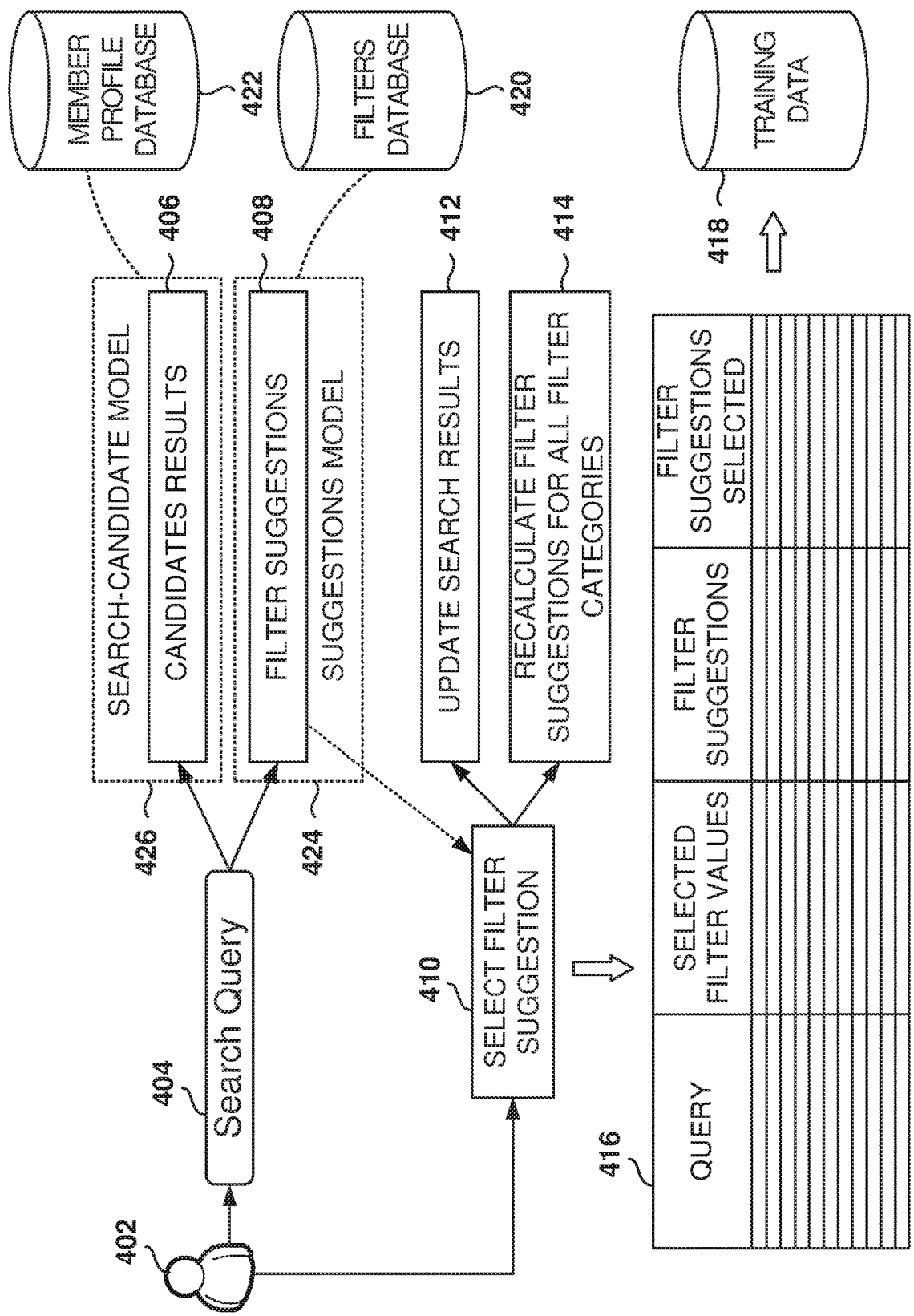
FIG. 4 illustrates the process for adding filter suggestions to the search query and the creation of training data, according to some example embodiments.

FIG. 4 illustrates the process for adding filter suggestions to the search query and the creation of training data, according to some example embodiments. When a user 402 enters a search query 404, the search-candidate model 426 calculates search results 406 (e.g., results displayed in search results panel 218 of FIG. 1A), and the suggestions model 424 calculates filter suggestions 408 (e.g., Engineering-Manager filter suggestion 206 of FIG. 2).

In some example embodiments, the search by the search-candidate model 426 includes accessing the member profile database 422 to match the search-query parameters to the characteristics of the members in the member profile database 422.

In some example embodiments, the suggestions ML model 424 generates the filter suggestions, from possible filter suggestions in filters database 420, based on the information about members, information about the user 402 performing the search, and the history of selections for suggested filter values. The set of possible filter suggestions may be built based on filter values previously entered by users, filter values configured by the system administrator, or the possible values for a given filter category (e.g., skills). In some example embodiments, the suggestions model accounts for an affinity among different filter values as found in member's profiles. For example, if the skills "Machine learning" and "Deep learning" are found frequently together in the members' profiles, when a search is made for "Machine learning," "Deep learning" will be ranked high because of the great degree of affinity between these two values.

After the search results 406 are presented, the user 402 selects 410 one of the filter suggestions, which causes the update of the search results 412 and the recalculation of the filter suggestions for all the filter categories 414.

Over time, the system collects information about the filter values entered directly by users (e.g., "Software Engineer"), filter suggestions presented, and the filter suggestions selected by the user 402. In some example embodiments, the queries entered by the users of the online service are also collected, as illustrated in table 416. This data, or a subset of it, is then used as training data 418 for the suggestions ML model 424 in order to predict which filter suggestions have a higher probability of being selected by the user based on the history of the search queries, the filter suggestions presented, the filter suggestions selected, and other information, such as member profile information of user 402 (e.g., a certain recruiter may focus searches on a certain industry or within a geographic location).

Further, the cycle to recalculate search results by adding more filter values may be repeated to narrow the search results.

Figure 5:
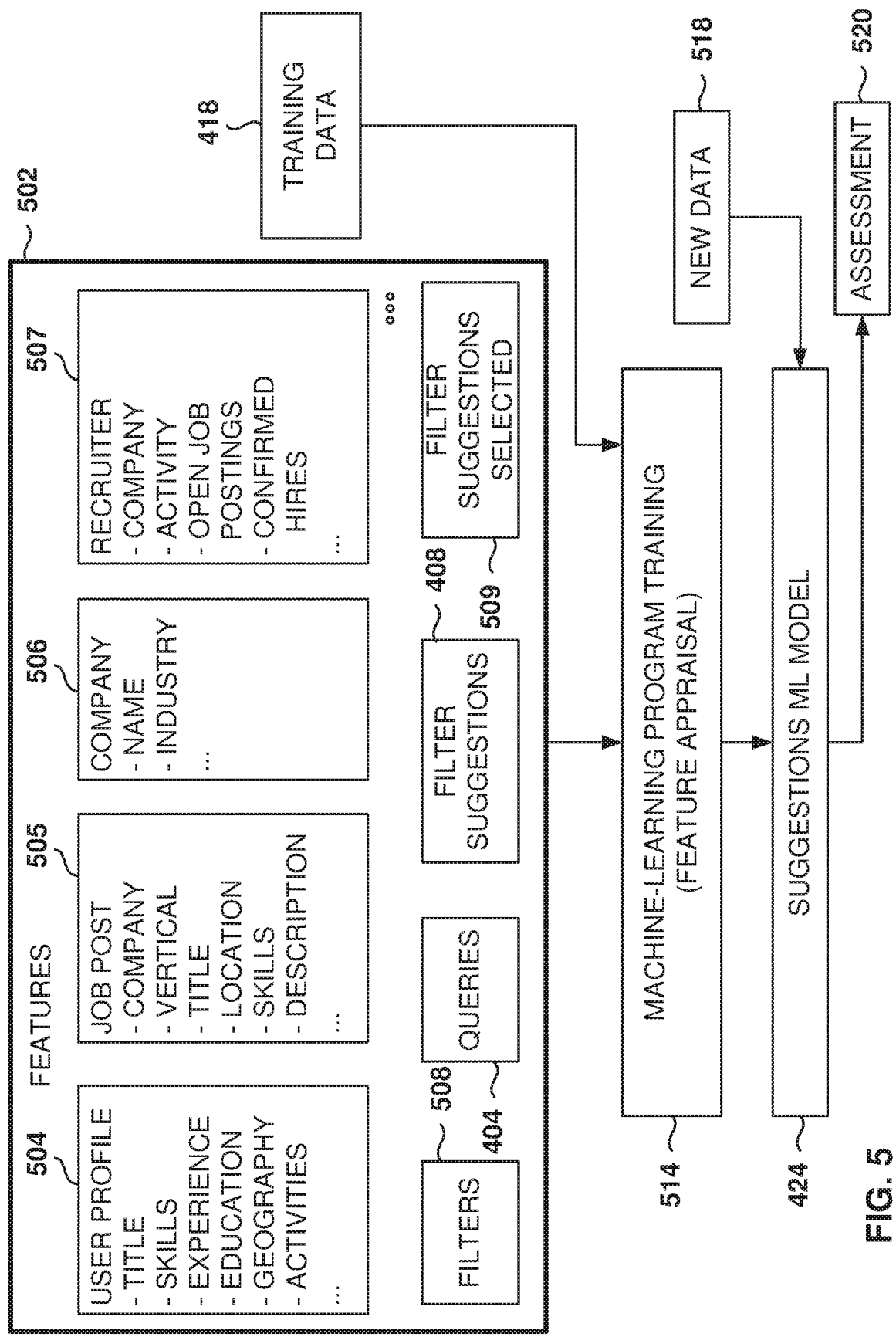
FIG. 5 illustrates the training and use of a machine-learning program, according to some example embodiments.

FIG. 5 illustrates the training and use of a machine-learning program, according to some example embodiments. In some example embodiments, machine-learning programs (MLP), also referred to as machine-learning algorithms or tools, are utilized to perform operations associated with ranking filter suggestions.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 418 in order to make data-driven predictions or decisions expressed as outputs or assessments 520. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for the suggestions model 424. Additionally, the search-candidate model 426 of FIG. 4 may be used for classifying or scoring candidates for a job post.

The machine-learning algorithms utilize features 502 for analyzing the data to generate output or assessments 520. A feature 502 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 502 may be of different types and may include one or more of user profile 504, job posts 505; company 506; recruiter profile 507, search filters 508, queries 404, filter suggestions 408, and filter suggestions selected by recruiters 509. In other embodiments for other types of searches, such as searching for jobs, user-feed items, connections, etc., additional features and/or fewer features may be added associated with the respective searches, such as advertisement features, news article features, etc.

The user profile features 504 include user profile information, such as title, skills, experience, education, geography, activities of the user in the online service, etc. The job posting features 505 include information about job postings, such as the company offering the job, title of the job post, location of the job post, skills required, description of the job, etc. Further, the company features 506 include information about the company posting the job, such as name of the company, industry, revenue information, locations, etc.

The recruiter features 507 includes information about recruiters using the online service, such as the company where the recruiter works, previous activity of the recruiter (e.g., jobs posted, filters selected, messages sent to candidates, open job postings, past job postings, confirmed hires). The filters features 508 include filters used in queries, e.g., job title, location, skills, companies working for, schools attended, and industry of the company where the user works.

The queries features 404 include queries previously entered by recruiters searching for candidates for job posts. The filter suggestions features 408 include filter suggestions previously presented to recruiters.

The ML algorithms utilize the training data 418 to find correlations among the identified features 502 that affect the outcome or assessment 520. In some example embodiments, the training data 418 includes known data for one or more identified features 502, such as the filter values entered by recruiters manually or filter suggestions selected by the recruiters.

In example embodiments, the training data 418 includes a history of activity related to the activation of filter suggestions, as illustrated in table 416 of FIG. 4. Thus, the training data 418 includes past queries, selected filter values, filter suggestions presented, and filter suggestions selected. In some example embodiments, the training data includes information about the recruiters in the online service. For example, filter suggestions are presented to users, and some are selected while others are not. The ones selected are labeled with a higher score than the ones that are not selected.

With the training data 418 and the identified features 502, the ML algorithm is trained at operation 514. The ML training appraises the value of the features 502 as they correlate to the training data 418. The result of the training is the suggestions ML model 424.

When the suggestions ML model 424 is used to perform an assessment, new data 518 is provided as an input to the suggestions ML model 424, and the suggestions ML model 424 generates the assessment 520 as output. For example, the suggestions ML model 424 may be used to rank possible filter suggestions, for one or more filter categories, and the highest ranked filter suggestions are then presented to the recruiter. In some example embodiments, the new data 518 (e.g., input data), includes the filter suggestions already selected, the job post data, the recruiter 507 data, and other values for the features 502.

In some example embodiments, the suggestions model is set to optimize a chosen parameter. For example, confirmed hires (job posts that result in an employee being hired) is a tracking parameter, and optimizing the system for more confirmed hires provides an advantage. The more confirmed hires, the more efficient the system is, which translates in improved service and increase revenue. Thus, in some example embodiments, the suggestions model will track the confirmed hires, based on the training data 418, to make filter suggestions that improve the probability that the outcome is a confirmed hire.

In some example embodiments, during the LTR training, the different filter suggestions being ranked are assigned a label, which can be a binary value (e.g., 0 or 1), or can be an integer value, where the different integer values may be used to improve the ranking of a filter value. For example, a filter value that has shown high correlation with confirmed hires is given a value of 2, while other filter values are assigned a value of 0 or 1 if there is no found correlation with confirmed hires. This way, the filter suggestions with a higher-value label will be ranked higher when searching or suggestions.

In some example embodiments, the suggestions model is optimized for a chosen parameter for the company posting the job post, such as by vertical function. Vertical functions refer to the different segments of the company, such as Research & Development, Sales & Marketing, Finance, etc. Based on the vertical associated with the job post, the suggestions model optimizes the goal for the vertical, as defined in the training data. That is, the job posts for the different verticals may result in different filter suggestions according to the objectives of each vertical.

Learning to rank (LTR) is one application of machine learning used for constructing models. In some example embodiments, LTR is used during the training to obtain the suggestions model 424. With LTR, the training data 418 consists of lists of items with some partial order specified between items in each list. For example, the order is specified by a numerical value assigned to each item in the list of items. The LTR ranking model's goal is to rank, that is, producing a permutation of items in new, unseen lists in a similar way to rankings in the training data.

In some example embodiments, the suggestions model is an LTR model that generates filter suggestions for all the filter categories, that is, for each category, a ranked list of filter suggestions is generated. The suggestions model is context aware, meaning that when the suggestions model evaluates filter suggestions for one filter category, the suggestions model takes into consideration the filter values selected for all filter categories, and not just the filter values selected for one category. By being context aware, the suggestions model provides better filter suggestions because the suggestions model is aware of the underlying relationships between the different filter categories.

In other example embodiments, for each filter category, a separate LTR model is used to produce the ranked list of filter suggestions. It is noted that although the filter suggestions are generated for one filter category, the training data includes the values for all the filter categories, since selection of filter values in one category may affect the ranking of the filter suggestions in another category. Thus, filter suggestions within each filter category may be ranked using LTR techniques to select the best filter suggestions for the filter category based on the current state of search.

Existing algorithms for LTR can be categorized into three groups by their input representation and loss function: the pointwise, pairwise, and listwise approach. The pointwise approach assumes that each query-document pair in the training data has a numerical or ordinal score. Then the LTR problem can be approximated by a regression problem: given a single query-document pair, predict its score or ordering, that is, determining which document of the pair is ranked higher based on their respective scores. Existing supervised machine learning algorithms can be readily used for this purpose. Ordinal regression and classification algorithms can also be used in pointwise approach when they are used to predict the score of a single query-document pair.

In the pairwise approach, the LTR problem is approximated by a classification problem: learning a binary classifier that can tell which document is better in a given pair of documents. Given a list of items with a known sort order (referred to as the ground truth), if this list of items is inputted to the LTR model, the output should match the known sort order. However, sometimes there are inversions in the ranking, where one item is ranked higher than another item when it should be ranked lower, which is referred to as an inversion vs. the ground truth. The goal during training 514 is to minimize the number of inversions that would take place during ranking.

For example, there is a list with three candidates: 1, 2, and 3. The ground truth indicates that 1 should be ranked higher than 2, and that 2 should be ranked higher than 3. When inputting 1 and 2 to the model for ranking (represented as I(1,2)), the result should be 1 is ranked higher than two (represented as an ordered pair O(1,2). Further, I(2, 3) will output O(2, 3), and I(1, 3) will output O(1, 3). However, if I(2,3) would generate O(3, 2), this would be an inversion with reference to the ground truth where 2 is ranked higher than 3.

In some example embodiments, the suggestions model provides a score for each item being ranked. In the aforementioned example, the suggestions model may generate scores S for the different items, such as S(1)=0.5, S(2)=0.4, and S(3)=0.3. Thus, by ranking according to these scores, the proper ranking is obtained. It is noted that respective scores of 0.9, 0.8, and 0.7, would also generate the proper sorting. This means that the actual score provides a value to help in sorting, but not necessarily an indication of a probability that the item (e.g., a filter suggestions) is the best match for the context. On the other hand, regression models aim at generating scores that provide an indication of the value of each filter suggestion, and the sorting is derived from these values.

Some examples of LTR algorithms include XGBoost, RankNet, LambdaRank, LambdaMART, PolyRank, and MPBoost. In some example embodiments, the XGBoost method was used for generating the filter suggestions, trained with a pairwise loss function, but other LTR methods may also be used.

Typically, LTR methods perform better than models based on regression methods (e.g., provide a score for each possible filter suggestion based on a regression analysis of the training data) because the LTR method is aware of the context. For selecting filter candidates, the context includes which filter values have been already selected, while the regression model just provides scores for the filter suggestions without considering the which filter values have already been selected.

In the pairwise approach, during training, the candidates for filter suggestions are compared in pairs to determine which should be ranked higher; the problem is localized to a pair of values. The filter suggestions within each filter category are compared in pairs to form a ranked list of filter suggestions within each filter category. The goal of the training is to create a suggestions ML model 424 that would generate the lowest number of inversions when comparing the ground truth in the training data with the estimated ordering.

During training 514, the suggestions model is constructed by minimizing a certain loss function on the training data. The loss function defines a value corresponding to the loss originated when items are not properly ranked. The trained model uses a ranking function to rank the filter suggestions, and the optimal ranking function for the suggestions model is determined from the training data by minimizing the loss function defined items in the training data (e.g., search queries, filter suggestions presented, filters selected, etc.).

In some example embodiments, in the pointwise approach for LTR filter suggestions, the model generates a ranked set of suggestions given the source entities (filter suggestions), represented as f(source entities, candidate)→S. Given one filter suggestion, the goal is to predict whether the suggestion will be selected, and no shared context considered, optimized for AUC (Area Under receiver operating characteristic Curve). For this case, the Loss function sigmoid cross-entry for binary relevance labels $y_j \in \{0,1\}$ is as follows:

$$l(y, \hat{y}) = -\sum_{j=1}^{n} y_j \log(p_j) + (1-y_j)\log(1-p_j)$$

In some example embodiments, in the pointwise approach for LTR filter suggestions, a pair of candidates is considered to predict which one ranks higher, with a shared context between the pair and optimized for the minimal number of inverted pairs. This is represented as f(source entities, candidate1, candidate2)→S. In this case, the loss function logistic loss is as follows:

$$l(y, \hat{y}) = -\sum_{j=1}^{n} \sum_{k=1}^{n} I(y_j > y_k) \log(1 + \exp(\widehat{y_k} - \widehat{y_k}))$$

In the listwise approach, the entire list of candidates is considered to predict the best permutation, using a shared context among all the candidates, and optimized for ranking metrics (e.g., Normalized Discounted Cumulative Gain (NDCG)) directly. This is represented as f(source entities, candidate1, . . . , candidateK)→S. In this case, the loss function softmax cross-entry loss is as follows:

$$l(y, \hat{y}) = -\sum_{j=1}^{n} y_j \log\left(\frac{\exp(\widehat{y_l})}{\sum_{j=1}^{n} \exp(\widehat{y_j})}\right)$$

After training the machine-learning program using LTR, the suggestions model 424 is used to estimate the filter suggestions based on the input data.

To provide the context, context-aware features are included in the suggestions model built with LTR, and the context includes identifying which filter categories (e.g., job title, skill) have been already selected, and which filter values within the filter categories have been selected (e.g., Software Engineer).

For example, if a recruiter selects ten skills for the search, this is a strong sign that skill is an important feature for the search. This context then is considered to make sure all filter suggestions are selected based on the selected skills. For example, companies that better match this set of skills are prioritized when selecting the best company filter suggestion. Similarly, the geographic filter suggestions may be selected based on the available number of potential candidates with the desired skills in the geographic location.

For example, when sorting three candidates, the ground truth is that candidate 1 should be ranked ahead of candidate 2, which should be ranked ahead of candidate 3. The comparisons, described in pairs, then includes (1,2), (2, 3), and (1, 3). The LTR method should determine that best of (1,2) is candidate 1, best of (2,3) is candidate 2, and the best of (1, 3) is candidate 1. If for example, best of (1,3) came out as candidate 3, then this would be considered an inversion with respect to the ground truth. The number of inversions is one of the factors when minimizing the loss function associated with the LTR machine-learning model.

After the suggestions ML model 424 is trained, the pointwise approach is used during inference to generate a score for each of the filter suggestions.

Figure 6:
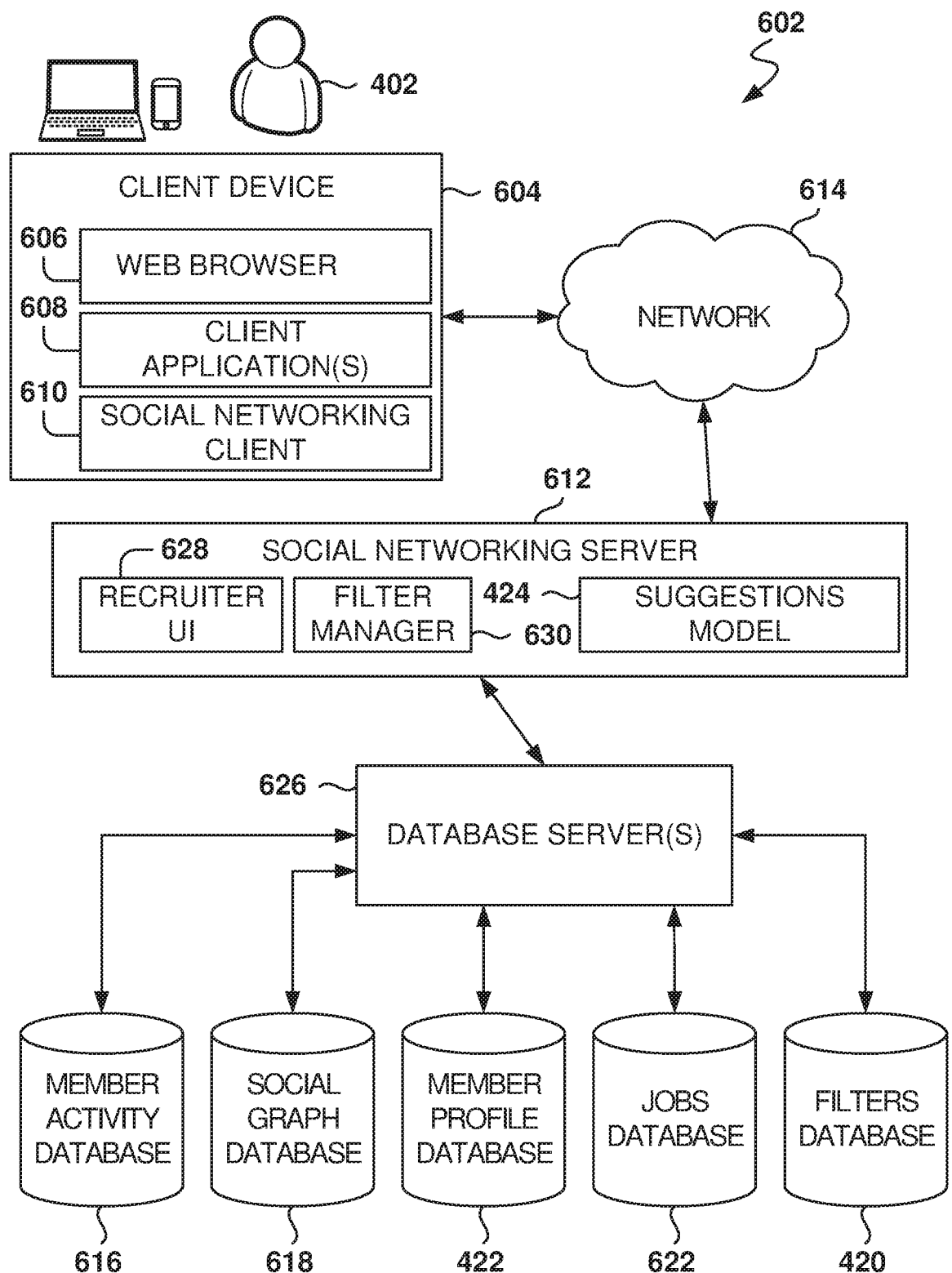
FIG. 6 is a block diagram illustrating a networked system, according to some example embodiments, illustrating an example embodiment of a high-level client-server-based network architecture.

FIG. 6 is a block diagram illustrating a networked system, according to some example embodiments, including a social networking server 612, illustrating an example embodiment of a high-level client-server-based network architecture 602. Embodiments are presented with reference to an online service and, in some example embodiments, the online service is a social networking service.

The social networking server 612 provides server-side functionality via a network 614 (e.g., the Internet or a wide area network (WAN)) to one or more client devices 604. FIG. 6 illustrates, for example, a web browser 606, client application(s) 608, and a social networking client 610 executing on a client device 604. The social networking server 612 is further communicatively coupled with one or more database servers 626 that provide access to one or more databases 616, 618, 422, 622, and 420.

The social networking server 612 includes, among other modules, a recruiter UI 628 (e.g., UI 100 of FIG. 2), a filter manager 630, and a suggestions ML model 424. The filter manager coordinates the operations managing filters, including adding, deleting, and modifying filter categories and filter suggestions.

The client device 604 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 402 may utilize to access the social networking server 612. In some embodiments, the client device 604 may comprise a display module (not shown) to display information (e.g., in the form of user interfaces).

In one embodiment, the social networking server 612 is a network-based appliance that responds to initialization requests or search queries from the client device 604. One or more users 402 may be a person, a machine, or other means of interacting with the client device 604. In various embodiments, the user 402 interacts with the social networking server 612 via the client device 604 or another means.

The client device 604 may include one or more applications (also referred to as "apps") such as, but not limited to, the web browser 606, the social networking client 610, and other client applications 608, such as a messaging application, an electronic mail (email) application, a news application, and the like. In some embodiments, if the social networking client 610 is present in the client device 604, then the social networking client 610 is configured to locally provide the user interface for the application and to communicate with the social networking server 612, on an as-needed basis, for data and/or processing capabilities not locally available (e.g., to access a user profile, to authenticate a user 402, to identify or locate other connected users 402, etc.). Conversely, if the social networking client 610 is not included in the client device 604, the client device 604 may use the web browser 606 to access the social networking server 612.

In addition to the client device 604, the social networking server 612 communicates with the one or more database servers 626 and databases 616, 618, 422, 622, and 420. In one example embodiment, the social networking server 612 is communicatively coupled to a member activity database 616, a social graph database 618, a member profile database 422, a job postings database 622, and an filters database 420. The databases may be implemented as one or more types of databases including, but not limited to, a hierarchical database, a relational database, an object-oriented database, one or more flat files, or combinations thereof.

The user profile database 620 stores user profile information about users 402 who have registered with the social networking server 612. With regard to the user profile database 620, the user 402 may be an individual person or an organization, such as a company, a corporation, a non-profit organization, an educational institution, or other such organizations.

In some example embodiments, when a user 402 initially registers to become a user 402 of the social networking service provided by the social networking server 612, the user 402 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 620. Similarly, when a representative of an organization initially registers the organization with the social networking service provided by the social networking server 612, the representative may be prompted to provide certain information about the organization, such as a company industry.

As users 402 interact with the social networking service provided by the social networking server 612, the social networking server 612 is configured to monitor these interactions. Examples of interactions include, but are not limited to, commenting on posts entered by other users 402, viewing user profiles, editing or viewing a user 402's own profile, sharing content outside of the social networking service (e.g., an article provided by an entity other than the social networking server 612), updating a current status, posting content for other users 402 to view and comment on, posting job suggestions for the users 402, searching job postings, and other such interactions. In one embodiment, records of these interactions are stored in the user activity database 616, which associates interactions made by a user 402 with his or her user profile stored in the user profile database 620.

The job postings database 622 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 626 are illustrated as a single block, one of ordinary skill in the art will recognize that the database server(s) 626 may include one or more such servers. Accordingly, and in one embodiment, the database server(s) 626 implemented by the social networking service are further configured to communicate with the social networking server 612.

Figure 7:
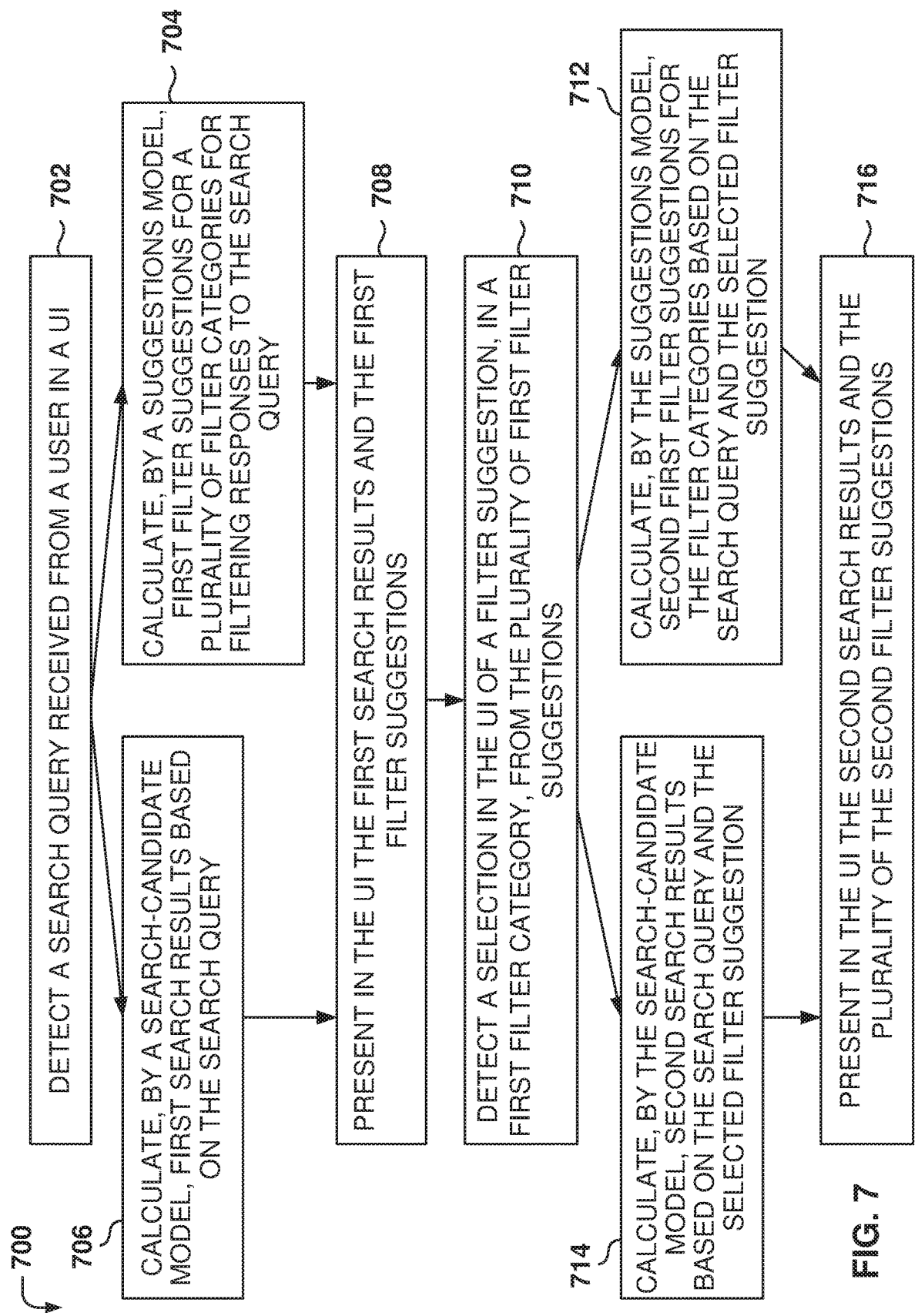
FIG. 7 is a flowchart of a method for providing dynamic search filter suggestions that are updated and ranked based on the user filter selections, according to some example embodiments.

FIG. 7 is a flowchart of a method 700 for providing dynamic search filter suggestions that are updated and ranked based on the user filter selections, according to some example embodiments. While the various operations in this flowchart are presented and described sequentially, one of ordinary skill will appreciate that some or all of the operations may be executed in a different order, be combined or omitted, or be executed in parallel.

At operation 702, one or more processors of an online service detect a search query received from a user in a user interface (UI).

In response to the search query, operations 704 and 706 are performed. At operation 706, a search-candidate model calculates first search results based on the search query. Further, at operation 704, a suggestions model calculates first filter suggestions for a plurality of filter categories for filtering responses to the search query. The suggestions model is obtained by training a machine-learning algorithm utilizing pairwise learning-to-rank modeling.

After performing operations 704 and 706, at operation 708, the first search results and the first filter suggestions are presented in the UI.

From operation 708, the method flows to operation 710 for detecting a selection in the UI of a filter suggestion, in a first filter category, from the plurality of first filter suggestions.

In response to the detection of the selected filter suggestion, operations 712 and 714 are performed. At operation 714, the search-candidate model calculates second search results for the plurality of filter categories based on the search query and the selected filter suggestion. Further, at operation 712, the suggestions model calculates second filter suggestions based on the search query and the selected filter suggestion.

From operations 712 and 714, the method flows to operation 716 for presenting in the UI the second search results and the plurality of the second filter suggestions.

In one example, the suggestions model is trained with training data associated with a plurality of features comprising filter suggestions, for the plurality of filter categories, presented to users of the online service and filter suggestions selected by the users.

In one example, the training data includes data collected from activity of users of the online service, the training data including:
queries submitted by users,
filter values for the plurality of filter categories selected by the users,
filter suggestions for the plurality of filter categories presented to the users, and
filter suggestions for the plurality of filter categories selected by the users.

In one example, presenting the first search results in the UI further comprises determining a filter value associated with the search query received, and presenting the filter value within the plurality of filter categories as a selected filter value.

In one example, the selected filter values are presented in the UI with a first format and the filter suggestions are presented in the UI with a second format different from the first format.

In one example, the filter categories are combined with a logical AND operation and the filter suggestions within each category are combined with a logical OR operation.

In one example, the filter categories are combined with a logical AND operation and the filter suggestions within each category are combined with a logical AND operation.

In one example, the filter categories are selected from a group comprising job title, location, skills, companies, schools attended, and industry.

In one example, the search query is for finding candidates for a job post.

In one example, updating the filter suggestions for the plurality of filter categories based on the ranking comprises calculating, for each filter category, the one or more filter suggestions based on the selected filter values.

Another general aspect is for a system that includes a memory comprising instructions and one or more computer processors. The instructions, when executed by the one or more computer processors, cause the one or more computer processors to perform operations comprising: detecting a search query received from a user in a user interface (UI); calculating, by a search-candidate model, first search results based on the search query; calculating, by a suggestions model, first filter suggestions for a plurality of filter categories for filtering responses to the search query, the suggestions model obtained by training a machine-learning algorithm utilizing pairwise learning-to-rank modeling; presenting in the UI the first search results and the first filter suggestions; detecting a selection in the UI of a filter suggestion, in a first filter category, from the plurality of first filter suggestions; in response to the detection of the selected filter suggestion: calculating, by the search-candidate model, second search results based on the search query and the selected filter suggestion; and calculating, by the suggestions model, second first filter suggestions based on the search query and the selected filter suggestion: and presenting in the UI the second search results and the plurality of the second filter suggestions.

In yet another general aspect, a machine-readable storage medium (e.g., a non-transitory storage medium) includes instructions that, when executed by a machine, cause the machine to perform operations comprising: detecting a search query received from a user in a user interface (UI); calculating, by a search-candidate model, first search results based on the search query; calculating, by a suggestions model, first filter suggestions for a plurality of filter categories for filtering responses to the search query, the suggestions model obtained by training a machine-learning algorithm utilizing pairwise learning-to-rank modeling; presenting in the UI the first search results and the first filter suggestions; detecting a selection in the UI of a filter suggestion, in a first filter category, from the plurality of first filter suggestions; in response to the detection of the selected filter suggestion: calculating, by the search-candidate model, second search results based on the search query and the selected filter suggestion; and calculating, by the suggestions model, second first filter suggestions based on the search query and the selected filter suggestion; and presenting in the UI the second search results and the plurality of the second filter suggestions.

During experimentation for the implementation of the embodiments presented herein, the suggestion ranking model caused more targeted and non-generic suggestions for recruiters when compared with previous approaches. This results in more relevant set of candidates for the ranking model to operate on. Ranking metrics among top positions were improved as a result as well as values the recruiters were getting from each search request, and eventually, translating into more confirmed hires.

Figure 8:
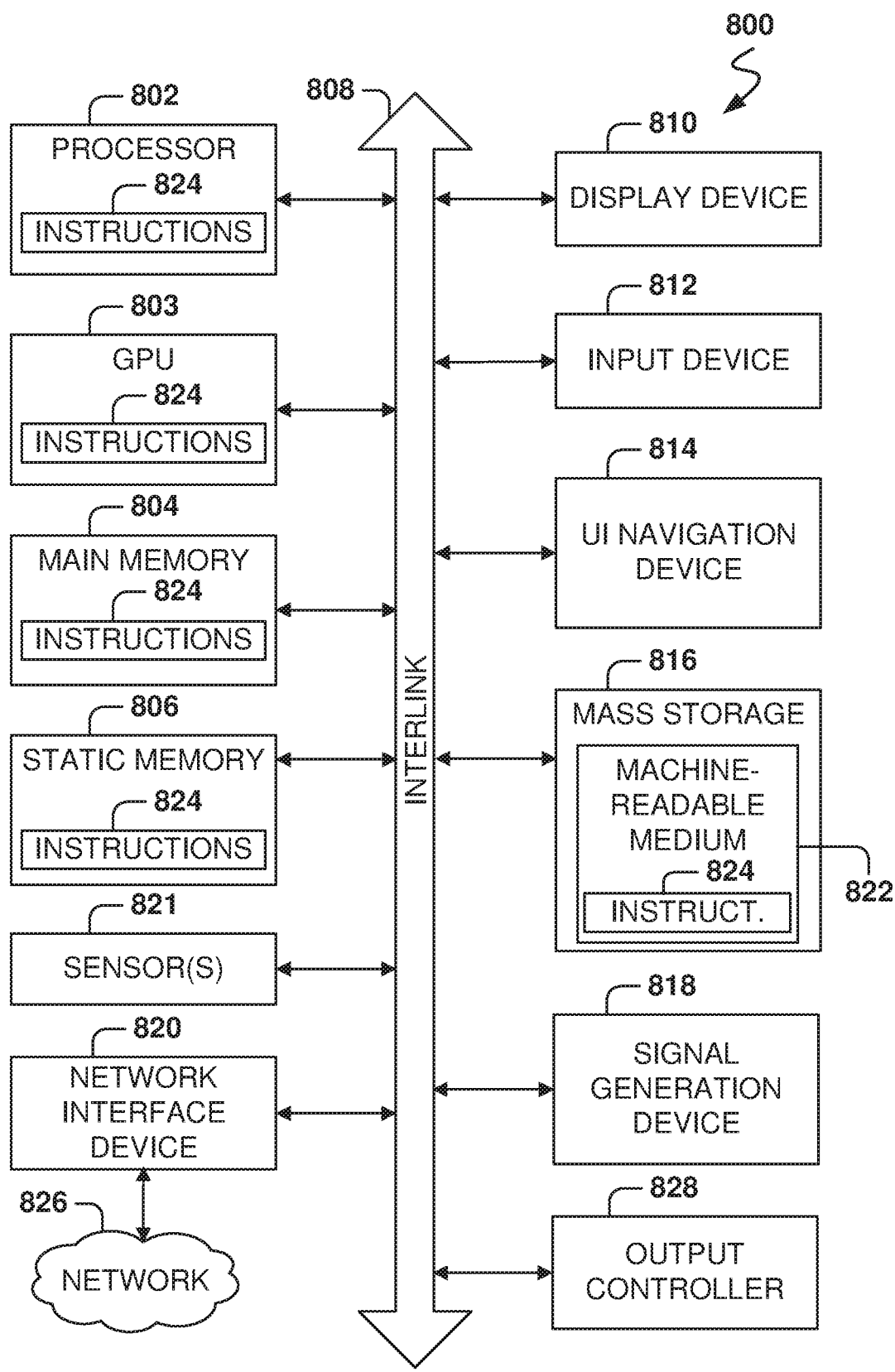
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   training a machine-learning program utilizing pairwise learning-to-rank modeling to obtain a suggestions model, the suggestions model being for predicting which filter suggestions have a higher probability of being selected by a user based on a search query, wherein the training with pairwise learning-to-rank modeling comprises:
      comparing candidate filter suggestions in pairs to determine which candidate from the pair should be ranked higher;
   detecting, by one or more processors of an online service, a search query received from a user in a user interface (UI);
   calculating, by a search-candidate model, first search results based on the search query;
   identifying first filter suggestion candidates for a plurality of filter categories for filtering responses to the search query;
   calculating, by the suggestions model, a score for each first filter suggestion candidate based on the search query, filter categories already selected, and filter values within the filter categories already selected;
   selecting from the first filter suggestion candidates based on the scores to obtain first filter suggestions for presentation to the user;
   presenting in the UI the first search results and the first filter suggestions;
   detecting a selection in the UI of a filter suggestion, in a first filter category, from the first filter suggestions;
   in response to the detecting of the selected filter suggestion:
      calculating, by the search-candidate model, second search results based on the search query and the selected filter suggestion; and
      calculating, using scores calculated by the suggestions model, second filter suggestions for the plurality of filter categories based on the search query and the selected filter suggestion; and
   presenting in the UI the second search results and the plurality of the second filter suggestions.

2. The method as recited in claim 1, wherein the suggestions model is trained with training data based on activities of users while querying an online service, the training data associated with a plurality of features comprising information on past queries performed by the users, filter suggestions presented to users of the online service, and filter suggestions selected by the users.

3. The method as recited in claim 2, wherein the training data comprises filter suggestions for the plurality of filter categories presented to the users and filter suggestions for the plurality of filter categories selected by the users.

4. The method as recited in claim 2, wherein the user is a recruiter, wherein the training data further comprises information about recruiters in the online service.

5. The method as recited in claim 2, wherein training the machine-learning program further comprises:
generating a lowest number of inversions when comparing a ground truth in the training data with an estimated ordering of filter suggestions.

6. The method as recited in claim 1, wherein presenting the first search results in the UI further comprises:
determining a filter value associated with the search query received; and
presenting the filter value within the plurality of filter categories as a selected filter value.

7. The method as recited in claim 1, wherein the selected filter suggestions are presented in the UI with a first format and unselected filter suggestions are presented in the UI with a second format different from the first format.

8. The method as recited in claim 1, wherein the filter categories are combined with a logical AND operation and the filter suggestions within each category are combined with a logical OR operation.

9. The method as recited in claim 1, wherein the filter categories are combined with a logical AND operation and the filter suggestions within each category are combined with a logical AND operation.

10. The method as recited in claim 1, wherein the filter categories comprise one or more of job title, location, skills, companies, schools attended, and industry.

11. The method as recited in claim 1, wherein calculating the first filter suggestions includes:
calculating the first filter suggestions based on filter categories for finding one or more candidates for a job post, the filter categories comprising one or more of job title, skill, and company.

12. The method as recited in claim 1, wherein the score generated by the suggestions model is a value to help in sorting but not an indication of a probability that the filter suggestions is a best match for the search query.

13. A system comprising:
a memory comprising instructions; and
one or more computer processors, wherein the instructions, when executed by the one or more computer processors, cause the system to perform operations comprising:
detecting a search query received from a user in a user interface (UI);
training a machine-learning program utilizing pairwise learning-to-rank modeling to obtain a suggestions model, the suggestions model being for predicting which filter suggestions have a higher probability of being selected by a user based on a search query, wherein the training with pairwise learning-to-rank modeling comprises:
comparing candidate filter suggestions in pairs to determine which candidate from the pair should be ranked higher;
calculating, by a search-candidate model, first search results based on the search query;
identifying first filter suggestion candidates for a plurality of filter categories for filtering responses to the search query;
calculating, by the suggestions model, a score for each first filter suggestion candidate based on the search query, filter categories already selected, and filter values within the filter categories already selected;
selecting from the first filter suggestion candidates based on the scores to obtain first filter suggestions for presentation to the user;
presenting in the UI the first search results and the first filter suggestions;
detecting a selection in the UI of a filter suggestion, in a first filter category, from the first filter suggestions;
in response to the detecting of the selected filter suggestion:
calculating, by the search-candidate model, second search results based on the search query and the selected filter suggestion; and
calculating, using scores calculated by the suggestions model, second filter suggestions for the plurality of filter categories based on the search query and the selected filter suggestion; and
presenting in the UI the second search results and the plurality of the second filter suggestions.

14. The system as recited in claim 13, wherein the suggestions model is trained with training data based on activities of users while querying an online service, the training data associated with a plurality of features comprising information on past queries performed by the users, filter suggestions presented to users of the online service, and filter suggestions selected by the users.

15. The system as recited in claim 13, wherein presenting the first search results in the UI further comprises:
determining a filter value associated with the search query received; and
presenting the filter value within the plurality of filter categories as a selected filter value.

16. The system as recited in claim 13, wherein the selected filter suggestions are presented in the UI with a first format and unselected filter suggestions are presented in the UI with a second format different from the first format.

17. The system as recited in claim 13, wherein the filter categories are combined with a logical AND operation and the filter suggestions within each category are combined with a logical OR operation.

18. The system as recited in claim 13, wherein the filter categories are combined with a logical AND operation and the filter suggestions within each category are combined with a logical AND operation.

19. The system as recited in claim 13, wherein the filter categories comprise one or more of job title, location, skills, companies, schools attended, and industry.

20. A non-transitory machine-readable storage medium including instructions that, when executed by a machine, cause the machine to perform operations comprising:
training a machine-learning program utilizing pairwise learning-to-rank modeling to obtain a suggestions model, the suggestions model being for predicting which filter suggestions have a higher probability of being selected by a user based on a search query, wherein the training with pairwise learning-to-rank modeling comprises:

comparing candidate filter suggestions in pairs to determine which candidate from the pair should be ranked higher;
detecting a search query received from a user in a user interface (UI);
calculating, by a search-candidate model, first search results based on the search query;
identifying first filter suggestion candidates for a plurality of filter categories for filtering responses to the search query;
calculating, by the suggestions model, a score for each first filter suggestion candidate based on the search query, filter categories already selected, and filter values within the filter categories already selected;
selecting from the first filter suggestion candidates based on the scores to obtain first filter suggestions for presentation to the user;
presenting in the UI the first search results and the first filter suggestions;
detecting a selection in the UI of a filter suggestion, in a first filter category, from the first filter suggestions;
in response to the detecting of the selected filter suggestion:
calculating, by the search-candidate model, second search results based on the search query and the selected filter suggestion; and
calculating, using scores calculated by the suggestions model, second filter suggestions for the plurality of filter categories based on the search query and the selected filter suggestion; and
presenting in the UI the second search results and the plurality of the second filter suggestions.

21. The non-transitory machine-readable storage medium as recited in claim 20, wherein the suggestions model is trained with training data based on activities of users while querying an online service, the training data associated with a plurality of features comprising information on past queries performed by the users, filter suggestions presented to users of the online service, and filter suggestions selected by the users.

* * * * *